United States Patent
Mills

(10) Patent No.: US 7,150,443 B2
(45) Date of Patent: Dec. 19, 2006

(54) CONTROL VALVE FOR NITROUS OXIDE INJECTION SYSTEM

(76) Inventor: Douglas W. Mills, P.O. Box 635, Alachua, FL (US) 32616

( * ) Notice: Subject to any disclaimer, the term of this patent is extended or adjusted under 35 U.S.C. 154(b) by 0 days.

(21) Appl. No.: 11/203,887

(22) Filed: Aug. 15, 2005

(65) Prior Publication Data

US 2006/0157108 A1    Jul. 20, 2006

Related U.S. Application Data

(63) Continuation-in-part of application No. 11/037,937, filed on Jan. 18, 2005.

(51) Int. Cl.
*F16K 31/122* (2006.01)
(52) U.S. Cl. ..................... 251/63.5; 251/285
(58) Field of Classification Search .............. 251/63.5, 251/63.6, 63, 62, 285
See application file for complete search history.

(56) References Cited

U.S. PATENT DOCUMENTS

| | | | |
|---|---|---|---|
| 3,592,357 A | 7/1971 | Welch | |
| 4,683,843 A | 8/1987 | Norcia et al. | |
| 4,955,340 A * | 9/1990 | Elliott | 123/297 |
| 5,063,898 A | 11/1991 | Elliott | |
| 5,441,234 A * | 8/1995 | White et al. | 251/144 |
| RE35,101 E | 11/1995 | Kelly | |
| 5,870,996 A | 2/1999 | DeLuca | |
| 6,073,862 A | 6/2000 | Touchette et al. | |
| 6,116,225 A | 9/2000 | Thomas et al. | |
| 6,349,709 B1 * | 2/2002 | Evert et al. | 251/310 |
| 6,520,165 B1 | 2/2003 | Steele | |
| 6,691,688 B1 | 2/2004 | Chestnut | |

* cited by examiner

Primary Examiner—John Bastianelli
(74) Attorney, Agent, or Firm—The Livingston Firm; Edward M. Livingston; Angela M. Miller

(57) ABSTRACT

A nitrous oxide or fuel control valve has flow control of nitrous oxide from a fluid-delivery aperture (7) or flow control of fuel from a fluid-delivery aperture (8) into a injection nozzle (22) of an intake manifold of an engine by actuation of an adjuster coupler nut (11) with an actuation piston (14) that is actuated with gas pressure from an actuation-pressure source (43) with an actuation on/off valve (25). It can be structured for low-weight, short-term needs for racing and other sports uses or for heavier long-term needs of engines.

15 Claims, 1 Drawing Sheet

CONTROL VALVE FOR NITROUS OXIDE INJECTION SYSTEM

CROSS REFERENCE TO RELATED APPLICATION

This is a continuation-in-part of application of Ser. No. 11/037,937 filed on Jan. 18, 2005.

BACKGROUND OF THE INVENTION

This invention relates to nitrous oxide injection systems, more particularly, to a valve which controls the introduction of nitrous oxide or fuel to an injection nozzle prior to injection into a manifold of an internal-combustion engine for enhancing effective pressure of subsequent combustion of the engine for racing and other enhanced-power uses.

Nitrous-oxide injector systems for enhancing power of internal-combustion engines are well known. None, however, are known to provide the introduction and control of nitrous oxide or fuel with an actuator valve operated by a compressed medium applying force to a piston in a cylinder to open the poppet valve of the nitrous oxide or fuel circuit in a manner taught by this invention.

Related but different prior art is known to include the following:

| Patent Number | Inventor | Issue/Publication Date |
| --- | --- | --- |
| U.S. Pat. No. 3,592,357 | Welch | Jul. 13, 1971 |
| U.S. Pat. No. 4,683,843 | Norcia et al. | Aug. 4, 1987 |
| U.S. Pat. No. 5,063,898 | Elliott | Nov. 12, 1991 |
| U.S. Pat. No. Re. 35,101 | Kelly | Nov. 28, 1995 |
| U.S. Pat. No. 5,870,996 | DeLuca | Feb. 16, 1999 |
| U.S. Pat. No. 6,073,862 | Touchette et al. | Jun. 13, 2000 |
| U.S. Pat. No. 6,116,225 | Thomas et al. | Sep. 12, 2000 |
| U.S. Pat. No. 6,520,165 B1 | Steele | Feb. 18, 2003 |
| U.S. Pat. No. 6,691,688 B1 | Chestnut | Feb. 17, 2004 |

SUMMARY OF THE INVENTION

Objects of patentable novelty and utility taught by this invention are to provide a nitrous oxide or fuel control valve which:

uses less electricity;

has less weight;

has higher flow rates;

can control the flow of a liquid or gaseous fluid;

can be repaired or replaced rapidly, easily and accurately;

can be powered with low-weight and simple power systems; and can be directly interchangeable with electric solenoid valves of conventional nitrous oxide systems.

This invention accomplishes these and other objectives with a nitrous oxide or fuel control valve having both a flow circuit from a valve with an actuation piston that is actuated with gas pressure from a low-weight actuation-pressure container controlled by a small electrical solenoid valve of low power consumption and low weight and capable of activating one or more nitrous oxide or fuel control valves taught by the present invention. The nitrous oxide is supplied by a low-weight pre-pressured first fluid container while the fuel is supplied by a mechanized pump or an electrical pump.

A poppet valve for the flow circuit is actuated with gas pressure to a pneumatic piston. The oxidizer or fuel are both under pressure for controlled release into the injection nozzle(s) by opening of valves for the separate circuits at the same time.

Prior art nitrous oxide injection systems employ a first separate, heavy and high-current consumption solenoid valve controlling the flow of the oxidizer and a second separate, heavy and high-current solenoid valve for injection of fuel into a mixing nozzle for injection into an intake manifold of an engine. Also, prior art nitrous oxide injection systems utilizing electronic fuel injection to introduce fuel into the engine's induction system and employ a first separate, heavy and high-current consumption solenoid valve to control the flow of the oxidizer to the injection nozzle(s). Accordingly, in proportion to increased engine power achieved by oxidizer injection systems, the combined weight of present systems is approximately two to three times greater and electrical-current consumption can be as much as one-hundred times greater than with this invention.

This invention eliminates the heavy and high current draw solenoid and lifts the poppet valve with a piston. The piston can provide much more lifting power than an electric solenoid, allowing a larger orifice and larger poppet valve to be employed, providing higher flow rates. The larger the orifice and poppet valve, the more area it displaces. The pressure of the medium being controlled can exceed 1,250 psi. This pressure is applied to the total area of the orifice so that the larger the orifice, and therefore the larger the area, the more force required to lift the poppet valve off of the orifice. A piston can provide very high lift force in a compact, lightweight package and not draw any electrical amperage.

Additionally, this invention incorporates a novel inlet circuit arrangement to provide high flow with reduced flow restrictions. Current nitrous oxide or fuel valves connect the inlet port to the orifice and poppet valve chamber that lies above the inlet port with straight or angled passages. As described hereafter in more detail in relation to a preferred embodiment, this invention places inlet port in alignment with chamber and an oval slot, round hole or other shaped-aperture completes the passage. The poppet lifts slightly above the top of the slot, providing unimpeded flow and eliminates a 90 degree (or less) turn (bend) and directs the flow directly into the orifice/poppet valve chamber.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

Figures 1, 2:
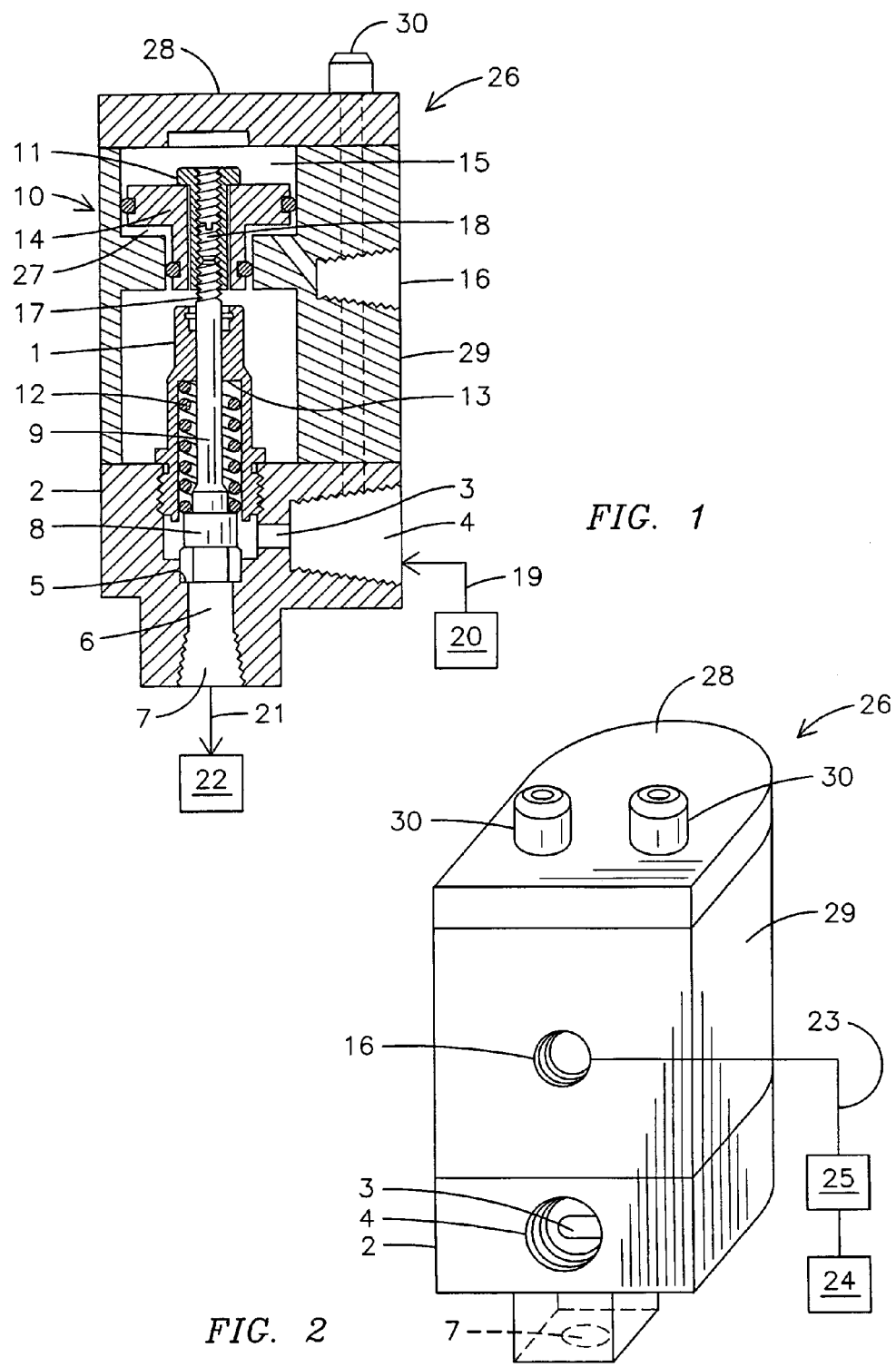
FIG. 1 is a partially cutaway side view of the control valve of the present.
FIG. 2 is an exterior rear perspective view of the control valve of the present invention.

A description of the preferred embodiment of this invention follows a list of numbered terms which designate its features with the same numbers on the drawings and in parentheses throughout the description and throughout the patent claims.

| | |
| --- | --- |
| 1. | valve-stem guide |
| 2. | valve housing |
| 3. | inlet aperture |
| 4. | fluid-supply aperture |
| 5. | valve aperture |

-continued

| | |
|---|---|
| 6. | outlet aperture |
| 7. | fluid-delivery aperture |
| 8. | valve |
| 9. | valve stem |
| 10. | injection activator |
| 11. | adjuster coupler nut |
| 12. | expansion-pressure spring |
| 13. | spring base |
| 14. | actuator piston |
| 15. | actuator cylinder |
| 16. | actuation-fluid inlet |
| 17. | adjustment threads |
| 18. | jam set screw |
| 19. | fluid-supply conveyance |
| 20. | fluid container |
| 21. | fluid-injection conveyance |
| 22. | injection nozzle |
| 23. | actuation-fluid conveyance |
| 24. | actuation-pressure source |
| 25. | actuation on/off valve |
| 26. | control valve |
| 27. | self-adjustment space |
| 28. | cover |
| 29. | cylinder housing |
| 30. | cap screws |

Referring to FIG. 1, the control valve 26 has a valve-stem guide 1 in a valve housing 2. An inlet aperture 3 is in fluid communication from a fluid-supply aperture 4 in the valve housing 2 to a valve outlet aperture 6 in the valve housing 2. An outlet aperture 6 is in fluid communication from the valve aperture 5 to a fluid-delivery aperture 7 in the valve housing 2.

A valve 8 is positioned on a valve stem 9. The valve stem 9 is reciprocatable within an internal periphery of the valve-stem guide 1. The valve 8 is structured for opening and closing the outlet aperture 6 with the valve stem 9 predeterminedly.

An actuator piston 14 is positioned proximate activation end of the valve stem 9. An injection activator 10 is in communication with the actuator piston 14 with the injection activator 10 being structured for actuating the actuator piston 14 predeterminedly for actuation of the valve 8 with the valve stem 9.

The valve 8 has a circuit capable of controlling the flow of a gas or liquid, at high or low pressure, or a vacuum. This flow of gas or liquid is stopped (i.e., the valve 8 is OFF when the valve stem 9, having compliant material on a lower end, such as Viton, Neoprene, Teflon, or similar polymer) is held against a valve outlet aperture 5 by the expansive force of the expansion-pressure spring 12. The flow of gas or liquid is initiated, i.e., the valve 8 is ON, when the valve stem 8 is lifted off, or above, the valve outlet aperture 5.

The fluid-supply aperture 4 is structured for receiving a fluid under pressure for directing the fluid to the outlet aperture 6.

The valve 8 can be a poppet valve structured on a valve end of the valve stem 9 for closing and opening the outlet aperture 6 predeterminedly. A poppet valve is intended to include a class of valves which plug openings to aperture predeterminedly.

A linear axis of the outlet aperture 6 is orthogonal to a linear axis of the fluid-supply aperture 4. A linear axis of the valve 8, the linear axis of the outlet aperture 6 and a linear axis of the valve stem 9 are collinear.

An expansion-pressure spring 12 is positioned with expansion pressure intermediate a spring base 13 proximate an activation end of the valve-stem guide 1 and the valve 8 for spring-pressing the valve 8 closed and for allowing predetermined inlet pressure of the air to open the valve 8 for fluid communication intermediate the inlet aperture 3 and the outlet aperture 6.

The injection activator 10 can include an actuator piston 14 in sliding-seal contact with an inside periphery of an actuator cylinder 15 in the cylinder housing 29. The actuator cylinder 15 has a linear axis collinear to and intermediate the valve-stem guide 1. An adjustor coupler nut 11 is extended perpendicularly from the actuator piston 14 to attach with the adjustment threads 17 of the valve stem 9.

The valve stem 9 can include adjustment threads 17 on activator ends thereof.

An adjuster coupler nut 11 and jam set screw 18 are screw-positioned on the threads 17 of the valve stem 9 at predetermined piston positions, thereby allowing the piston to travel until stopping against a cover 28 to secure the valve stem 9 and providing a predetermined lift of the valve 8.

A self-adjustment space 27 beneath the piston 14 allows the valve 8 to rest securely against the valve aperture 5 to completely stop and seal pressurized flow.

The actuation-fluid inlet 16 is in fluid communication with the pressure-actuation floor of the actuator cylinder 15. The pressure-actuation floor of the actuator cylinder 15 is beneath the actuator piston 14 for actuating travel of the adjuster couplet nut 11 in the valve-opening direction. The smaller diameter stem of the actuator piston 14 has a sliding seal to contain the actuation fluid. The actuation fluid acts forcefully on both the small diameter and the large diameter of the actuator piston 14 and moves the actuator piston 14 upward in the direction of the most force developed by the larger area of the larger diameter.

The fluid-supply conveyance 19 is formed and positioned for fluid communication from a fluid container 30 to the fluid-supply aperture 4.

A fluid-injection conveyance 21 is formed and positioned for fluid communication from the fluid-delivery aperture 7 to a predetermined injection nozzle 22.

An actuation-fluid conveyance 23 is formed and positioned for fluid communication from an actuation-pressure source 24 to the actuator cylinder 15.

An actuation on/off valve 25 is positioned predeterminedly in timing communication intermediate the actuation-pressure source 24 and the actuator cylinder 15.

The actuation-pressure source 24 can include structure for pre-pressured containment of a gas for light-weight and quick-supply needs for racing and other predetermined engine uses.

The actuation on/off valve 25 can include a low-power electrical system for timed release of gas pressure from the actuation-pressure source 24.

The actuation-pressure source 24 can include structure for onboard pressurization of a gas for heavy-duty needs that include transportation, industrial, working and other predetermined engine uses.

Cap screws 30 extending through vertical holes secure the components, i.e., the cover 28, cylinder housing 29 and valve housing 2, during operation.

A new and useful nitrous oxide injection valve having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A control valve comprising:
one valve-stem guide in a valve housing;
an inlet aperture in fluid communication from a fluid-supply aperture in the valve housing to a valve aperture in the valve housing;
an outlet aperture in fluid communication from the valve aperture to a fluid-delivery aperture in the valve housing;
a valve on a valve stem;
the valve stem being reciprocatable within an internal periphery of the valve-stem guide;
the valve being structured for opening and closing the outlet aperture with the valve stem predeterminedly;
an adjuster coupler nut proximate activation ends of the valve stem;
an injection activator in communication with the actuator piston and adjuster coupler nut; and
the injection activator being structured for actuating the adjuster coupler nut predeterminedly for actuation of the valve with the valve stem.

2. The control valve of claim 1 wherein:
the fluid-supply aperture is structured for receiving a fluid under pressure for directing the fluid to the outlet aperture; and
the valve is a poppet valve structured on a valve end of the valve stem for closing and opening the outlet aperture predeterminedly.

3. The control valve of claim 1 wherein:
a linear axis of the outlet aperture is orthogonal to a linear axis of the fluid-supply aperture;
a linear axis of the valve, the linear axis of the outlet aperture and a linear axis of the valve stem are collinear;
the linear axis of the outlet aperture is orthogonal to a linear axis of the fluid-delivery aperture; and
an expansion-pressure spring is positioned with expansion pressure intermediate a spring base proximate an activation end of the valve-stem guide and the valve for spring-pressing the valve closed and for allowing predetermined inlet pressure air against an actuator piston to open the valve for fluid communication intermediate the inlet aperture and the outlet aperture.

4. The control valve of claim 1 wherein:
the injection activator includes an actuator piston in sliding-seal contact with an inside periphery of an actuator cylinder in the valve housing;
the actuator cylinder has a linear axis collinear to and intermediate the valve-stem guide;
an adjuster coupler nut passes through a piston centerline to attach to the valve stem; and
an actuation-fluid conveyance is in fluid communication with a pressure-actuation end of the actuator cylinder.

5. The control valve of claim 4 wherein:
the pressure-actuation end of the actuator piston is above the stem end of the poppet valve for actuating travel of the adjuster coupler nut in a valve-opening direction.

6. The control valve of claim 5 wherein:
the valve stem includes threads on top end thereof; and
an adjuster coupler nut and jam set screw are screw-positioned on the threads of the valve stem to activate the poppet valve.

7. A control valve comprising:
one valve-stem guide in a valve housing;
an inlet aperture in fluid communication from a fluid-supply aperture in the valve housing to a valve aperture in the valve housing;
an outlet aperture in fluid communication from the valve aperture to a fluid-delivery aperture in the valve housing;
a valve on the valve stem;
the valve stem being reciprocatable within the internal periphery of the valve-stem guide;
the valve being structured for opening and closing the outlet aperture with the valve stem predeterminedly;
an adjuster coupler nut proximate activation ends of the valve stem;
an injection activator in communication with the adjuster coupler nut;
the fluid-supply aperture is structured for receiving the fluid under pressure for directing the fluid to the outlet aperture;
the valve is the poppet valve structured on the valve end of the valve stem for closing and opening the outlet aperture predeterminedly;
a linear axis of the outlet aperture is orthogonal to the linear axis of the fluid-supply aperture;
a linear axis of the valve, the linear axis of the outlet aperture and the linear axis of the valve stem are collinear;
a linear axis of the outlet aperture is orthogonal to the linear axis of the fluid-delivery aperture;
an expansion-pressure spring is positioned with expansion pressure intermediate the spring base proximate the activation end of the valve-stem guide and the valve for spring-pressing the valve closed and for allowing predetermined inlet pressure of air to open the valve;
the injection activator includes the actuator piston in sliding-seal contact with the inside periphery of the actuator cylinder in the valve housing;
the actuator cylinder has the linear axis collinear to and intermediate the valve-stem guide;
an adjuster coupler nut passes through a piston centerline to attach to the valve stem;
an actuation-fluid conveyance is in fluid communication with the pressure-actuation end of the actuator cylinder;
the pressure-actuation end of the actuator piston is above the stem end of the poppet valve for actuating travel of the adjuster coupler nut in the valve-opening direction;
the valve stem includes threads on activator end thereof; and
an adjuster coupler nut and jam set screw are screw-positioned on the threads of the valve stem to secure the adjuster coupler nut to the valve stem.

8. The control valve as in any one of the preceding claims in which:
a fluid-supply conveyance is structured and positioned for fluid communication from a fluid container to the fluid-supply aperture; and
a fluid-injection conveyance is structured and positioned for fluid communication from the fluid-delivery aperture to a predetermined injection nozzle.

9. The control valve of claim 8 wherein:
an actuation-fluid conveyance is structured and positioned for fluid communication from an actuation-pressure source to the actuator cylinder; and
an actuation on/off valve is positioned predeterminedly in fluid communication intermediate the actuation-pressure source and the actuator cylinder.

10. The control valve of claim 9 wherein:
the actuation-pressure source includes structure for pre-pressured containment of a gas for light-weight uses.

11. The control valve of claim 10 wherein:
the actuation on/off valve includes a low-power electrical system for timed release of gas pressure from the actuation-pressure source.

12. The control valve of claim 9 wherein:
the actuation on/off valve includes a low-power electrical system for timed release of gas pressure from the actuation-pressure source.

13. The control valve of claim 9 in which:
the actuation-pressure source includes structure for onboard pressurization of a gas for heavy-duty uses.

14. The control valve of claim 13 in which:
the actuation on/off valve includes a heavy-duty electrical system for long-term timing of release of gas pressure from the actuation-pressure source.

15. The control valve of claim 9 wherein:
the actuation on/off valve includes a heavy-duty electrical system for long-term timing of release of gas pressure from the actuation-pressure source.

* * * * *